US006500509B1

(12) United States Patent
Katsuro et al.

(10) Patent No.: US 6,500,509 B1
(45) Date of Patent: Dec. 31, 2002

(54) PRESSURE SENSITIVE TRANSFER TAPE

(75) Inventors: Noboru Katsuro, Osaka (JP); Yutaka Sakanishi, Osaka (JP); Yuji Tsunomori, Osaka (JP)

(73) Assignee: Fujicopian Co., Ltd., Osaka (JP)

( * ) Notice: Subject to any disclaimer, the term of this patent is extended or adjusted under 35 U.S.C. 154(b) by 0 days.

(21) Appl. No.: 09/443,066

(22) Filed: Nov. 18, 1999

(30) Foreign Application Priority Data

Nov. 19, 1998 (JP) .......................................... 10-329488
Nov. 19, 1998 (JP) .......................................... 10-329489
Jan. 13, 1999 (JP) .......................................... 11-006867

(51) Int. Cl.[7] ............................ B32B 7/12; B41J 31/09
(52) U.S. Cl. .................. 428/40.1; 15/104.94; 118/257; 428/40.2; 428/41.4; 428/41.7; 428/41.8; 428/354; 428/355; 428/447; 428/448
(58) Field of Search .............................. 428/40.1, 40.2, 428/41.4, 41.7, 41.8, 447, 448, 354, 355; 15/104.94; 118/257

(56) References Cited

U.S. PATENT DOCUMENTS

| | | | | |
|---|---|---|---|---|
| 3,515,590 A | | 6/1970 | Lazzarini | 117/235 |
| 3,847,725 A | | 11/1974 | Hochner | 161/167 |
| 4,211,826 A | | 7/1980 | Du | 428/497 |
| 4,260,664 A | | 4/1981 | Dapp | 428/476.9 |
| 4,289,666 A | | 9/1981 | Creekmore | 260/23 H |
| 4,746,388 A | | 5/1988 | Inabe | 156/241 |
| 4,883,379 A | | 11/1989 | Fukuda | 400/697.1 |
| 4,891,260 A | | 1/1990 | Kunkel | 428/220 |
| 5,135,798 A | | 8/1992 | Muschter | 428/202 |
| 5,221,577 A | | 6/1993 | Inaba | 428/354 |
| 5,393,368 A | | 2/1995 | Stevens | 156/577 |
| 5,432,006 A | * | 7/1995 | Kessel | 428/447 |
| 5,523,167 A | | 6/1996 | Hunt | 428/484 |
| 5,700,552 A | | 12/1997 | Katsuro | 428/214 |
| 5,712,045 A | | 1/1998 | Miyai | 428/522 |

FOREIGN PATENT DOCUMENTS

| | | |
|---|---|---|
| DE | 41 17 404 C1 | 10/1992 |
| EP | 0 446 030 A2 | 9/1991 |
| EP | 0 479 221 A2 | 4/1992 |
| EP | 0 699 725 A1 | 3/1996 |
| EP | 0 733 483 A1 | 9/1996 |
| JP | 09226235 | 9/1997 |
| JP | A 10-219202 | 8/1998 |
| JP | 10309867 | 11/1998 |
| JP | 11140396 | 5/1999 |

OTHER PUBLICATIONS

WPI Database, Section Ch, Week 9722, Derwent Publications Ltd., London, GB; Class A89, AN 97–238959, XP002076728 and JP 09 052438 A (Fujicopian Co. Ltd.); Feb. 25, 1997.

* cited by examiner

*Primary Examiner*—Nasser Ahmad
(74) *Attorney, Agent, or Firm*—Fish & Neave

(57) ABSTRACT

A pressure sensitive transfer tape such as transfer-type pressure sensitive correction tape or transfer-type pressure sensitive adhesive tape, for mounting in a handy-type transfer tool is provided, comprising a film support, which in turn comprises an organic polymer, and a pressure sensitive transfer layer on the film support, the pressure sensitive transfer layer comprising at least a pressure sensitive adhesive layer, the support having a first coefficient of kinetic friction on the transfer layer side of the support against a surface of a receiving object and a second coefficient of kinetic friction on the rear side of the support against a head member of a transfer tool, the first coefficient of kinetic friction being larger than the second coefficient of kinetic friction, and the difference between the first coefficient of kinetic friction and the second coefficient of kinetic friction being not less than 0.01.

9 Claims, 2 Drawing Sheets

PRESSURE SENSITIVE TRANSFER TAPE

BACKGROUND OF THE INVENTION

The present invention relates to a pressure sensitive transfer tape, such as a transfer-type pressure sensitive correction tape, or a transfer-type pressure sensitive adhesive tape. More particularly, the invention relates to a transfer-type pressure sensitive correction tape wherein a pressure sensitive transfer layer, which is comprised of a masking layer and a pressure sensitive adhesive layer, is transferred onto a paper surface or a like surface by being pressed against the surface by means of a handy-type transfer tool such that an image comprising characters or the like is masked and thus erased, and wherein it is possible to write with a writing tool, such as a ballpoint pen or a pencil, on the surface of the transfer layer. The invention further relates to a transfer-type pressure sensitive adhesive tape, wherein a pressure sensitive adhesive layer is transferred onto a receiving object, such as a paper surface, by being pressed against the paper surface by means of a handy-type transfer tool such that another article can be pasted on the receiving object.

Nowadays, there is greater interest in transfer-type pressure sensitive correction tapes than in conventional correction liquids. This is because transfer-type pressure sensitive correction tapes offer advantages, such as ease of handling and the ability to write on corrected spots immediately after correction.

Known transfer-type pressure sensitive correction tapes have a structure, wherein a pressure sensitive transfer layer, including a masking layer containing a white pigment, and a pressure sensitive adhesive layer is provided on one side of a support. As the support, generally paper sheets, such as glassine paper, which have undergone a releasing treatment, are used. Such transfer-type pressure sensitive correction tapes are mounted in a handy-type transfer tool.

FIG. 1 is a schematic view showing one example of a handy-type transfer tool in which a pressure sensitive correction tape is mounted, and FIG. 2 is an enlarged view of a main part thereof. 1 denotes a transfer-type pressure sensitive correction tape, wherein a pressure sensitive transfer layer 3, which includes a masking layer and a pressure sensitive adhesive layer laminated in this order, on a support 2. Main components of the transfer tool comprise a supply reel 10 for the pressure sensitive correction tape 1, a winding reel 11 for the support 2, and a wedge-shaped head 12 for pressuring the pressure sensitive correction tape 1 onto a receiving object 13, such as a sheet of paper. It should be noted that the following are omitted in FIGS. 1 and 2: a gear mechanism for driving the supply reel 10 and the winding reel 11, a cartridge for setting the supply reel 10 and the winding reel 11 to be mounted into the transfer tool and a case body.

When the transfer tool is moved on the receiving object 13 in the direction of arrow A, the pressure sensitive correction tape 1 is drawn out and pressed by the head 12, whereby the pressure sensitive transfer layer 3 is parted from the support 2 and adhered onto the receiving object. At the same time, the support 2, which has been parted from the pressure sensitive transfer layer 3, is wound by the winding reel 11.

Recently, there is a need to make smaller transfer tools. Consequently, pressure sensitive correction tapes must also be reduced in thickness and width. However, conventional pressure sensitive correction tapes using paper supports cannot meet such requirements.

In view of this fact, it has been proposed to use an organic polymer film, which has undergone a releasing treatment, as the support. However, using such an organic polymer film causes the following drawbacks. First, slips are caused while running the pressure sensitive correction tape because the support is a polymer film. In particular, where the pressure sensitive correction tape 1 is drawn out from a transfer tool while the support 2 at a portion of the head 12 is not provided with a pressure sensitive transfer layer 3 as shown in FIG. 2, the required friction force with respect to a common receiving object (such as, usual paper, etc.) can not be obtained because the polymer film is highly smooth. Thus, a slip is generated at a normal pressing force such that the pressure sensitive correction tape 1 can not be drawn out. Hereinafter, the characteristics of the support that do not cause a slip are denoted as favorable running characteristics of the support. The next problem is that the high smoothness of the polymer film results in a glossy surface of the transferred pressure sensitive transfer layer. That is, the interface of the masking layer, which is applied onto a release layer, with the release layer, which is applied on the polymer film, also becomes highly smooth. When such a masking layer is transferred onto a paper sheet, the surface of the transferred masking layer will be glossy in contrast to the unglossy surface of the paper receiving the transfer. The paper surface is of low smoothness so that the corrected portion, which is originally not intended to stand out, will be conspicuous. Hereinafter, the characteristics wherein the surface of the transferred masking layer is unglossy is denoted as "unglossiness".

In order to solve the above problems, it is desirable to increase the friction force with respect to the receiving object or to address unglossiness, such as by incorporating particles into the polymer film or performing a sand matting treatment on one surface of the polymer film. However, each results in higher costs.

Further, transfer-type pressure sensitive adhesive tapes are also of greater interest than double-sided adhesive tapes or stick-type glues due to the ease of handling.

Known transfer-type pressure sensitive adhesive tapes have a structure, wherein a pressure sensitive adhesive layer is provided on one side of a support. As the support, generally paper sheets, such as glassine paper, which have undergone a releasing treatment, are used. Such transfer-type pressure sensitive adhesive tapes are mounted in a handy-type transfer tool.

FIG. 3 is a schematic view showing an example of a handy-type transfer tool in which a pressure sensitive adhesive tape is mounted, and FIG. 4 is an enlarged view of a main part thereof. 21 denotes a transfer-type pressure sensitive adhesive tape, wherein a pressure sensitive adhesive layer 23 is provided on a support 22 as a pressure sensitive transfer layer. Main components of the transfer tool comprise a supply reel 10 for the pressure sensitive adhesive tape 21, a winding reel 11 for the support 22, and a wedge-shaped head 12 for pressuring the pressure sensitive adhesive tape 21 onto a receiving object 13, such as a sheet of paper. It should be noted that the following are omitted in FIGS. 3 and 4: a gear mechanism for driving the supply reel 10 and the winding reel 11, a cartridge for setting the supply reel 10 and the winding reel 11 to be mounted into the transfer tool and a case body.

When the transfer tool is moved on the receiving object 13 in the direction of arrow A, the pressure sensitive adhesive tape 21 is drawn out and pressed by the head 12, whereby the pressure sensitive adhesive layer 23 is parted from the support 22 and adhered onto the receiving object 13. At the same time, the support 22, which has been parted from the pressure sensitive adhesive layer 23, is wound by the winding reel 11.

Recently, it is desirable to make smaller transfer tools. Consequently, pressure sensitive adhesive tapes must also be reduced in thickness and width. However, conventional pressure sensitive adhesive tapes using paper supports cannot meet such requirements.

In view of this fact, it has been proposed to employ an organic polymer film, which has undergone a releasing treatment, as the support. However, using such an organic polymer film causes slips while running, the pressure sensitive adhesive tape because the support is a polymer film. In particular, where the pressure sensitive adhesive tape 21 is drawn out from a transfer tool while the support 22 at a portion of the head 12 is not provided with a pressure sensitive adhesive layer 23 as shown in FIG. 4, the required friction force with respect to a common receiving object (such as, usual paper, etc.) can not be obtained because the polymer film is highly smooth. Thus, a slip is generated at a normal pressing force such that the pressure sensitive adhesive tape 21 can not be drawn out.

In order to solve the above problems, a roller head is used as the head of the transfer tool. Further, it is desirable to increase the friction force with respect to the receiving object such as by incorporating particles into the polymer film or performing a sand matting treatment on one surface of the polymer film. However, this results in higher costs.

As described above, there is a need to make smaller transfer tools and longer transfer-type pressure sensitive correction tapes or adhesive tapes. There is also a need to make transfer-type pressure sensitive correction tapes or adhesive tapes with reduced thickness. One way to reduce the thickness of transfer-type pressure sensitive correction tapes or adhesive tapes is to use thin supports. However, a lower limit for the thickness is approximately 30 μm in view of strength in the case of glassine paper, which is generally used in conventional tapes. It has then been proposed to use an organic polymer film as the support. However, the present inventors have discovered that the simple use of a thin organic polymer film may lead to degradation in transferability and so, such a film is practically not suitable for use. The term "transferability" of transfer-type pressure sensitive correction tapes or adhesive tapes denotes characteristics, wherein a desired length of the transfer layer onto which pressure is applied with being drawn out from the transfer tool is completely transferred, and wherein the portion of the transfer layer transferred are easily cut off from the remaining portion when a larger pressure is applied at the time when the transfer operation is finished so that no undesired portions are transferred.

In view of the above facts, it is an object of the present invention to provide a compact-type pressure sensitive transfer tape, such as a transfer-type pressure sensitive correction tape or transfer-type pressure sensitive adhesive tape that presents favorable running characteristics of a support at low costs.

It is another object of the present invention to provide a pressure sensitive transfer tape, such as a transfer-type pressure sensitive correction tape or transfer-type pressure sensitive adhesive tape that further presents favorable transferability while using a thin organic polymer film as a support.

SUMMARY OF THE INVENTION

The present invention provides (1) a pressure sensitive transfer tape, comprising a film support, which in turn comprises an organic polymer, and a pressure sensitive transfer layer on the film support, the pressure sensitive transfer layer comprising at least a pressure sensitive adhesive layer, the support having a first coefficient of kinetic friction on the transfer layer side of the support against a surface of a receiving object and a second coefficient of kinetic friction on the rear side of the support against a head member of a transfer tool, the first coefficient of kinetic friction being larger than the second coefficient of kinetic friction, and the difference between the first coefficient of kinetic friction and the second coefficient of kinetic friction being not less than 0.01.

The present invention further provides (2) the pressure sensitive transfer tape according to the above (1), wherein the support has respective release layers on both sides thereof, and wherein the release layer on the transfer layer side contains not less than 1% by weight of inorganic or organic particles having an average particle size of 0.3 to 5 μm.

The present invention further provides (3) the pressure sensitive transfer tape according to the above (1), wherein the pressure sensitive transfer layer has a laminated structure comprising a masking layer, and a pressure sensitive adhesive layer laminated in this order from the support side.

The present invention further provides (4) the pressure sensitive transfer tape according to the above (3), wherein the support has respective release layers on both sides thereof, and wherein the release layer on the transfer layer side contains not less than 1% by weight of inorganic or organic particles having an average particle size of 0.3 to 5 μm.

The present invention further provides (5) the pressure sensitive transfer tape according to the above (1), wherein the pressure sensitive transfer layer comprises the pressure sensitive adhesive layer alone.

The present invention further provides (6) the pressure sensitive transfer tape according to the above (5), wherein the support has respective release layers on both sides thereof, and wherein the release layer on the transfer layer side contains not less than 1% by weight of inorganic or organic particles having an average particle size of 0.3 to 5 μm.

The present invention further provides (7) the pressure sensitive transfer tape according to the above (1), having the following relationships:

$$Y \leqq 25\ \mu m$$

$$X/Y \geqq 1$$

wherein Y denotes a thickness of the support and X a thickness of the pressure sensitive transfer layer.

The present invention further provides (8) the pressure sensitive transfer tape according to the above (7), wherein the pressure sensitive transfer layer has a laminated structure comprising a masking layer, and a pressure sensitive adhesive layer laminated in this order from the support side.

The present invention further provides (9) the pressure sensitive transfer tape according to the above (8), wherein the support has respective release layers on both sides thereof, and wherein the release layer on the transfer layer side contains not less than 1% by weight of inorganic or organic particles having an average particle size of 0.3 to 5 μm.

DETAILED DESCRIPTION OF THE INVENTION

Figure 1:
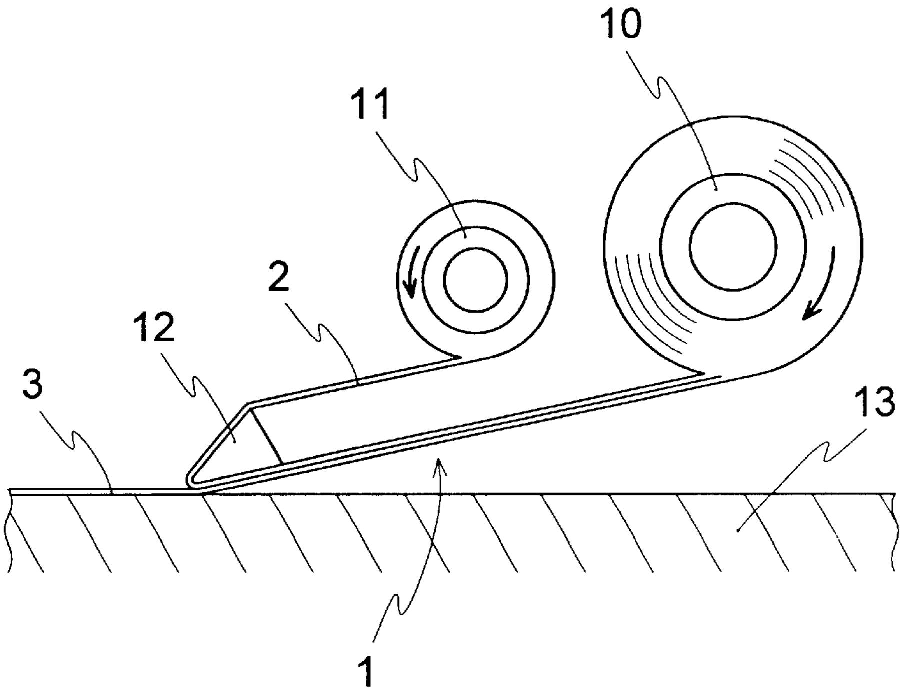
FIG. 1 is a schematic view showing an example of a handy-type transfer tool in which a transfer-type pressure sensitive correction tape according to one embodiment of the present invention is mounted.

The pressure sensitive transfer tape according to the present invention has a structure, wherein a pressure sensitive transfer layer comprising at least a pressure sensitive adhesive layer as an uppermost layer thereof is provided on a film support, comprising an organic polymer. The pressure sensitive transfer tape of the present invention includes a transfer-type pressure sensitive correction tape having a structure, wherein a pressure sensitive adhesive layer, comprising a masking layer, and a pressure sensitive adhesive layer laminated in this order, is provided on a film support, comprising an organic polymer. The pressure sensitive transfer-type of the present invention also includes a transfer-type pressure sensitive adhesive tape having a structure, wherein a pressure sensitive transfer layer, comprising a pressure sensitive adhesive layer alone, is provided on a film support, comprising an organic polymer.

The present inventors have made intensive studies for eliminating slips at the time of drawing out the film support of a transfer-type pressure sensitive correction tape or adhesive tape and discovered that such slips can be eliminated by using a film support having a first coefficient of kinetic friction on the transfer layer side of the support against a surface of a receiving object and a second coefficient of kinetic friction on the rear side of the support against a head member of a transfer tool, wherein the first coefficient of kinetic friction is larger than the second coefficient of kinetic friction, and the difference between the first coefficient of kinetic friction and the second coefficient of kinetic friction is not less than 0.01.

The present inventors have also discovered that the coefficient of kinetic friction against usual paper can be increased by providing respective release layers on both sides of the film support, and by incorporating inorganic or organic particles in the release layer on the transfer layer side so that the release layer assumes an uneven surface, as a means for providing a difference between coefficients of kinetic friction against respective objects on the front and rear sides of the film support. Since a treatment for matting the support is not required in such cases, products can be offered at low costs.

It should be noted that it is possible to achieve a difference in coefficient of kinetic friction against respective objects on the front and rear sides of the film support by using respective releasing agents having different slip characteristics on the front and rear sides. However, because a treatment for matting the film support must be performed to obtain the unglossiness of the pressure sensitive transfer layer in this type of transfer-type pressure sensitive correction tape, the cost for the support is increased, which in turn increases the cost of the products. In the transfer-type pressure sensitive correction tape of the present invention, both an increase in coefficient of kinetic friction against usual paper, as well as unglossiness of the transferred transfer layer, can be achieved by providing respective release layers on both sides of the film support and by incorporating inorganic or organic particles in the release layer on the transfer layer side so that the surface of the release layer assumes an uneven surface as a means for providing a difference between coefficients of kinetic friction to respective objects on the front and rear sides of the film support.

The inventors have further made intensive studies for addressing the problems associated with using a thin organic polymer film as the support. In the case where a pressure sensitive transfer tape, such as a transfer-type pressure sensitive correction tape or adhesive tape, is mounted in a handy-type transfer tool for performing transfer, it may be considered that it be sufficient to use a thin support film for improving the transferability by effectively transmitting the pressurizing force of the it head to the transfer layer via the support film. It was actually the case that the transferability could not be improved so much even by using a thin organic polymer film simply but was rather degraded. However, it has been unexpectedly discovered that the transferability can be remarkably improved where the thickness Y of the organic polymer film is set to be not more than 25 $\mu$m while maintaining a relationship of $X/Y \geqq 1$ for the thickness Y of the organic polymer film (where a release layer is provided: on the organic polymer film, the thickness Y means a total thickness of the organic polymer film and the release layer) and thickness X of the pressure sensitive transfer layer (i.e., a laminated structure of the masking layer and pressure sensitive adhesive layer in the case of a transfer-type pressure sensitive correction tape, and the pressure sensitive adhesive layer in the case of a transfer-type pressure sensitive adhesive tape). While the reason for this is not quite evident, it is assumed that the balance between the cushioning characteristics owned by the transfer layer and the rigidity of the organic polymer film is important in the case of transferring by pressing the transfer tape through the head, and that a favorable balance can be achieved where X and Y satisfy the above relationship.

Thus, because it is possible to use an organic polymer film having a thickness of not more than 25 $\mu$m as a support, making smaller transfer tools and use of long transfer tapes can be achieved.

The present invention will now be explained in detail.

In the present invention, a support, comprising an organic polymer film and respective release layers on both sides of the organic polymer film, wherein particles having an average particle size of 0.3 to 5 $\mu$m are contained in the release layer on the side in contact with a pressure sensitive transfer layer (a masking layer in a pressure sensitive transfer layer in the case of a transfer-type pressure sensitive correction tape, and a pressure sensitive adhesive layer in the case of a transfer-type pressure sensitive adhesive tape) is preferably used. With such a structure, it is easy to achieve a coefficient of kinetic friction on the transfer layer side of the support against a surface of a receiving object larger than the coefficient of kinetic friction on the rear side of the support against a head of a transfer tool, and to achieve a difference between the coefficients of kinetic friction of not less than 0.01, resulting in excellent running characteristics of the support. In addition, excellent unglossiness can be obtained in the case of transfer-type pressure sensitive correction tapes. It should be noted that, although an upper limit for the difference between the coefficient of kinetic friction on the transfer layer side of the support against the surface of the receiving object and the coefficient of kinetic friction on the rear side of the support against the head of the transfer tool is not particularly limited, generally it is approximately 0.50.

The coating amount (on a dry weight basis, hereinafter the same) of the release layer on the side contacting the pressure sensitive transfer layer is preferably about 0.1 to 2.0 g/m$^2$. An average particle size for the inorganic or organic particles that are added into the release layer is preferably in the range of 0.3 to 5 μm. If the average particle size is less than 0.3 μm, an effect of making the surface of the release layer uneven is hardly achieved. On the other hand, if the average particle size is larger than 5 μm, such an effect is remarkable but drawbacks are presented in that it becomes difficult to disperse particles uniformly in the release layer or particles come off the release layer easily.

Examples of particles include inorganic particles, such as silica, zirconia and titanium oxide, and organic particles, such as particles of melamine resin and particles of high molecular weight polyethylene wax, while they are not particularly limited.

The content of inorganic or organic particles in the release layer is preferably not less than 1% by weight, more preferably in the range of 1 to 45% by weight. If the content of particles is less than 1% by weight, the effect of making the surface of the release layer uneven can not be sufficiently displayed. On the other hand, if the content exceeds 45% by weight, original functions of the release layer are lost and deficiencies in adhesion of the release layer to the support or deficiencies in peeling of the masking layer from the release layer tend to be generated.

Examples of releasing agents for the release layer include silicone resins, fluorine-containing resins and waxes. Among these, silicone resins are preferably used.

As for the release layer on the rear side of the support, a release layer similar to the release layer on the side contacting the transfer layer, except that no particles are incorporated, may be used.

As the organic polymer film, films having a thickness of approximately 5 to 100 μm are preferably used. Films having a thickness of 6 to 25 μmare more preferably used. If the thickness is less than 5 μm, a sufficient strength is not exhibited when the film is processed into a tape-like shape such that the film is unsuitable for practical use. On the other hand, if the thickness exceeds 100 μm, compactness can not be achieved and inconveniences may occur at the time of processing. With respect to transferability, a film having a thickness of not more than 25 μm is particularly preferable, and with respect to compactness, a film having a thickness of not more than 20 μm is preferably used. Examples of suitable materials for the film are polyesters such as polyethylene terephthalate (PET) and polyethylene naphthalate, polypropylene and polyethylene. However, the polymer materials are not particularly limited. With respect to strength, polyester films are especially preferable.

In the case of a transfer-type pressure sensitive correction tape according to the present invention, a masking layer and a pressure sensitive adhesive layer are provided in this order on the release layer of the film support, the release layer containing particles.

The masking layer is comprised of a masking agent and a polymer having rubber elasticity as a binder.

Preferable polymers having rubber elasticity are those presenting flexibility and containing only a small amount of plasticizer. Examples of such polymers are, for instance, styrene polymers, polyurethane rubbers, fluorine containing rubbers, acrylonitrile-butadiene rubber, ethylene-vinyl acetate copolymer, ethylene-alkyl acrylate copolymer, chlorosulfonated polyethylene and cyclized rubber. These polymers may be used either alone or in a combination of two or more in view of transferability. Preferred polymers having rubber elasticity are styrene polymers. Examples of styrene polymers are, for instance, styrene-butadiene-styrene block copolymer (SBS), styrene-ethylene-butylene-styrene block copolymer (SEBS), styrene-butadiene rubber, styrene-isoprene-styrene block copolymer (SIS) and styrene-ethylene/propylene block copolymer (SEP). Such styrene polymers may be used either alone or in a combination of two or more.

As for the binder for the masking layer, a resin may be used in combination with the polymer having rubber elasticity. By the addition of resin, improvements in cutting-off characteristics of the masking layer and adjustments of hardness of the masking layer are possible. Such resins preferably have a small elongation percentage, a melting or softening point of not less than 100° C., and a high hardness. Examples of specific resins are, for instance, hydrocarbon resins (preferably saturated or unsaturated alicyclic hydrocarbon resins), styrene-acryl copolymer, ketone resins, vinyl chloride-vinyl acetate copolymer, and polyolefin resins, such as polyethylene or polypropylene. These resins may be either used alone or in a combination of two or more.

In the case of a transfer-type pressure sensitive correction tape, it is desirable to acheive further requirements in addition to the transferability, for instance, that no cracks occur in the transfer layer when the transfer layer is transferred onto a desired spot (hereinafter referred to as "crack resistance") and that it is possible to write on the transferred transfer layer with a writing tool, such as a pencil or a ballpoint pen (hereinafter referred to as "writability").

It is preferable that the composition of the masking layer according to the present invention be suitably selected such that favorable crack resistance and writability are exhibited in addition to favorable transferability.

In view of this point, the binder for the masking layer according to the present invention preferably has an elongation percentage of not less than 3.5×10$^2$% (a measured value at ordinary temperature in accordance with the testing method of ASTM D-412, hereinafter the same ). If the elongation percentage is less than 3.5×10$^2$%, the crack resistance tends to be degraded or a partial transfer failure tends to occur. The upper limit for the elongation percentage of the binder is generally 5.2×10$^2$%.

The binder for the masking layer comprises one or more polymers having rubber elasticity such that they are used either alone or in a combination of two or more so as to satisfy the aforesaid elongation percentage. A more preferable binder is a combination of one or more of the aforesaid polymers having rubber elasticity and one or more of the aforesaid resins, especially a combination of one or more of the polymers having rubber elasticity with an elongation percentage of not less than 4.5×10$^2$% and one or more of the resins having an elongation percentage of not more than 50%.

In the case where the polymer having rubber elasticity and resin are used in combination, the mixing ratio may vary depending upon the elongation percentages of the polymer having rubber elasticity and the resin. However, the mixing ratio is preferably selected such that the elongation percentage of the resulting binder is not less than 3.5×10$^2$%. The combination of a polymer having rubber elasticity with an elongation percentage of not less than 4.5×10$^2$% and a resin having an elongation percentage of not more than 50% can provide a binder that imparts the masking layer with excellent flexibility, writability and cutting-off characteristics. A typical mixing ratio is in the range of 2 to 30 parts (parts by weight, hereinafter the same), preferably 5 to 15 parts of a resin, with respect to 10 parts of a polymer having rubber elasticity. A binder containing the polymer and the resin in such a mixing ratio exhibits suitable elasticity and is capable of forming a masking layer that is superior in writability after transfer. If the proportion of resin exceeds the above range, or if the binder is composed of resin alone, the resulting masking layer is poor in flexibility and cracks are likely to occur at the time of transfer. If the proportion of resin is less than the above range, the resulting masking layer is poor in writability, and the cutting-off characteristics of the masking layer is degraded. The cutting-off characteristics is further degraded if the binder is comprised of the polymer having rubber elasticity alone.

In view of obtaining favorable cutting-off characteristics, the masking layer is preferably of a porous structure. To this end, a filler is generally incorporated into the masking layer. Examples of such fillers are, for instance, magnesium carbonate, calcium carbonate, barium carbonate, barium sulfate, aluminum oxide, silicon dioxide, sellaite, clay and talc. The particle size of the filler is preferably in the range of 1 to 20 $\mu$m. If the particle size is too small, the cutting-off characteristics is degraded, and if the particle size is too large, the writability is degraded.

The filler is preferably mixed in an amount of 5 to 40 parts, more preferably 5 to 18 parts, with respect to 10 parts of the binder. If the proportion of the filler is too large, chalking phenomenon is caused, and if the proportion of the filler is too small or no filler is used, the cutting-off characteristics of the masking layer tends to be degraded.

Because the object to be corrected using the pressure sensitive correction tape of the present invention is typically white paper, the masking layer is typically colored white by using a white masking agent. However, in the case where the object is a paper sheet or a like article that is colored other than white, it is preferable that the masking layer be colored substantially the same color as the background color of the object so that masked portions can not be distinguished from remaining background portions and, thus, do not stand out.

As for the white masking agent, titanium oxide is mainly used due to its superior hiding power. Non-white masking agents that may be used in the present invention are inorganic pigments, such as Titanium Yellow, iron oxide pigments, Ultramarine Blue, Cobalt Blue, Chromium Oxide Green, Spinel Green, Chrome Yellow, Chrome Vermilion, Cadmium Yellow, Cadmium Red and aluminum powder, and organic pigments, such as azo lake pigments, Hanza pigments, benzimidazolone pigments, monoazo pigments, diarylide pigments, pyrazolone pigments, condensed azo pigments, phthalocyanine pigments, quinacridone pigments, perylene pigments, perinone pigments, dioxazine pigments, anthrachinone pigments and isoindolinone pigments. The amount of the masking agent used is preferably 5 to 40 parts, more preferably 10 to 20 parts with respect to 10 parts of the binder though it varies depending upon the dispersibility and hiding power of the masking agent used. If the amount of the masking agent is excessive, chalking phenomenon in which masking agent powder bleeds out onto the masking layer surface occurs, and if the amount of the masking agent is too small, the hiding power may be insufficient.

The masking layer may contain additives, such as dispersing agents in addition to the above components.

The thickness (which indicates the thickness after drying, hereinafter the same) of the masking layer is preferably in the range of 10 to 40 $\mu$m, more preferably 12 to 30 $\mu$m. If the thickness is less than the above range, the masking layer is insufficient in hiding power. On the other hand, if the thickness exceeds the above range, cutting-off characteristics at the time of transfer or writability after transfer tend to be degraded. Further, when a copy of a paper sheet masked with the masking layer is made, boundary portions between masked portions and unmasked portions of the paper sheet are copied as shades such that the obtained copy is undesirable.

The pressure sensitive adhesive layer is a coating layer of a pressure-sensitive adhesive. Examples of such pressure sensitive adhesives include acrylic resin based adhesives, rosin based adhesives, rubber based adhesives, vinyl ether resin based adhesives and polyisobutylene based adhesives. The pressure sensitive adhesive layer can be formed by applying a solution or dispersion of the adhesive in an organic solvent or an aqueous solution or dispersion (inclusive of emulsion) of the adhesive onto the masking layer and drying thereafter. The thickness of the pressure sensitive adhesive layer is preferably in the range of 0.8 to 5 $\mu$m, more preferably in the range of 0.8 to 3 m.

In the case of the transfer-type pressure sensitive adhesive tape of the present invention, a pressure sensitive adhesive layer is formed on the release layer of the aforesaid film support that contains particles therein. While the pressure sensitive adhesive layer of the transfer-type pressure sensitive adhesive tape may be similar to the pressure sensitive adhesive layer of the aforesaid transfer-type pressure sensitive correction tape, a suitable thickness thereof is in the range of approximately 10 to 40 $\mu$m.

In a preferred embodiment of the present invention, the thickness X of the pressure sensitive transfer layer (i.e., a laminated structure of masking layer and pressure sensitive adhesive layer in the case of a transfer-type pressure sensitive correction tape, and a pressure sensitive adhesive layer in the case of a transfer-type pressure sensitive adhesive tape) and the thickness Y of the support preferably satisfy the following relationships:

$$Y \leqq 25\ \mu\text{m}$$

$$X/Y \geqq 1$$

whereby favorable transferability can be obtained. Here, the thickness Y of the support denotes a thickness including the thickness of the release layer where the support is provided with the release layer. In the case where the release layer contains particles, the thickness of the release layer is the thickness of portions where there are no particles protruding from the release layer surface.

The pressure sensitive transfer tape (transfer-type pressure sensitive correction tape and transfer-type pressure sensitive adhesive tape) of the present invention is mounted in a handy-type transfer tool (for instance, those as shown in FIGS. 1 to 2 and FIGS. 3 to 4). Upon use thereof, slip of the support is prevented by making the difference between the coefficient of kinetic friction of the transfer layer side of the film support against the surface of the receiving object and the coefficient of kinetic friction of the rear side of the film support against the head of the transfer tool not less than 0.01, so that the pressure sensitive transfer tape can be drawn out smoothly. In the case of the transfer-type pressure sensitive correction tape, superior unglossiness of the surface of the transferred pressure sensitive transfer layer can be further exhibited. The unglossiness of the surface of the transferred pressure sensitive transfer layer is preferably not more than 35 in terms of gloss. In the case where the gloss is not more than 35, no particular incompatibility is observed on the receiving object, such as paper.

Usual paper (plain paper), which is a typical receiving object for pressure sensitive transfer tapes, assumes a surface that is fairly uneven. In order to achieve high friction with such paper, it is necessary that the support of the transfer tape also assumes an uneven surface so that the contact area can be increased. In the present invention, friction force with the receiving object (such as, usual paper, etc.) can be increased by making the release layer surface uneven through inorganic or organic particles contained in the release layer of the support on the side contacting the pressure sensitive transfer layer. This allows for favorable running characteristics of the support. Materials for the head of the transfer tool are usually plastics, such as polyacetal, polypropylene, polystyrene, polycarbonate, polyethylene, ABS resin and AS resin. By suitably selecting materials for the receiving object and materials for the head, the respective coefficients of kinetic friction on both surfaces of the support are set to desired values. The pressure sensitive adhesive tape of the present invention is suitably utilized in a transfer tool having a wedge-shaped head owing to the superior running characteristics of the support.

The present invention will be more fully described by way of Examples. It is to be understood that the present invention is not limited to these Examples, and various changes and modifications may be made in the invention without departing from the spirit and scope thereof.

EXAMPLE 1

Releasing Treatment of Support

A release layer was formed by applying and drying a silicone resin-containing liquid of the following composition on one side of a PET film having a thickness of 12 μm so that the coating amount after drying was 0.5 g/m$^2$ (thickness: 0.5 μm).

Composition of silicone resin-containing liquid

| Component | Parts by weight |
|---|---|
| Silicone resin (KS-3502, manufactured by Shin-Etsu Silicone Co., Ltd.) | 20 |
| Platinum catalyst | 0.2 |
| Toluene | 40 |
| Xylene | 40 |
| Silica (average particle size: 1.5 μm) | 0.2 |

A composition similar to the above silicone resin-containing liquid, except without silica particles, was applied onto a rear surface of the PET film so that the thickness after drying was 0.5 μm and dried thereafter to form a release layer on the rear side.

Manufacture of Transfer Tape

A white pigment ink of the following composition was applied onto the particles-containing release layer of the above support so that the thickness after drying was 20 μm and dried thereafter to form a masking layer. Onto the masking layer was applied an acrylic resin based adhesive so that the thickness after drying was 1 μm and dried thereafter to form a pressure sensitive adhesive layer, yielding an original web for transfer-type pressure sensitive correction tape.

Composition of white pigment ink

| Component | Parts by weight |
|---|---|
| Hydrocarbon resin (elongation percentage: 0%) | 5 |
| SEBS copolymer (elongation percentage: 750%) | 5 |
| Dispersing agent | 2 |
| Titanium oxide | 30 |
| Aluminum powder | 0.2 |
| Toluene | 57 |

Figure 2:
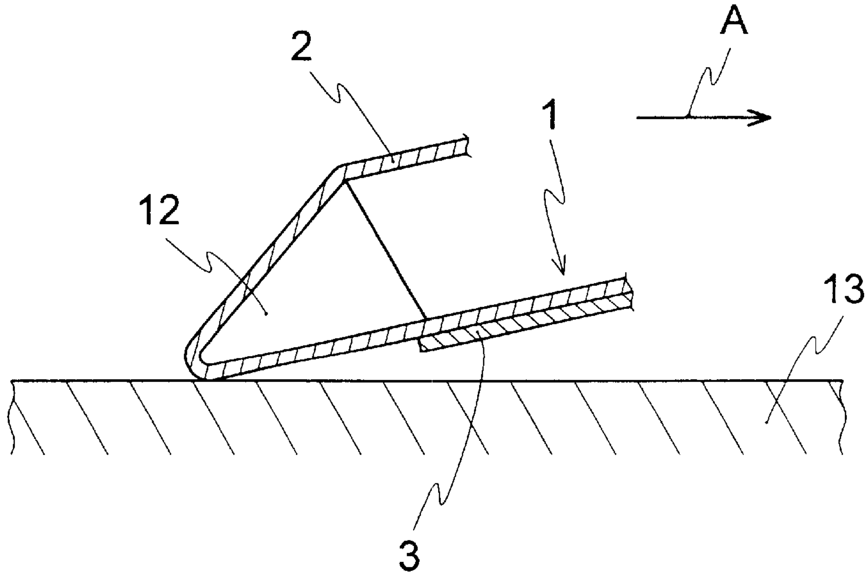
FIG. 2 is an enlarged view of a main portion of the transfer tool as shown in FIG. 1.

The original web for pressure sensitive correction tape obtained above was slit into 5 mm-wide tapes and, at the same time, each tape having a length of 10 m was wound around a core to obtain a sample in a pancake form. The pancake sample was mounted in a commercially available handy-type transfer tool (having a structure as shown in FIGS. 1 to 2) to obtain a pressure sensitive correction tape transfer tool.

EXAMPLES 2 TO 3 COMPARATIVE EXAMPLES 1 TO 3

The same procedures as in Example 1, except that the content of silica particles in the release layer on the side contacting the masking layer was changed to values as shown in Table 1, were repeated to give original webs for pressure sensitive correction tape, from which pancakes were produced. Each pancake was mounted in a transfer tool to yield pressure sensitive correction tape transfer tools. In Comparative Example 3, glassine paper having a thickness of 40 μm was used as the support.

Coefficients of kinetic friction of the supports were measured and performances of the pressure sensitive correction tapes were evaluated according to the following methods. The results are shown in Table 1.

Method for Measuring Coefficients of Kinetic Friction

A tester for measuring sliding properties manufactured by FUJICOPIAN CO., LTD. was employed. Each of the supports was sampled to assume a width of 5 mm and a length of approximately 20 cm and the sample was adhered onto a table of the tester. An object (PPC paper sheet) was adhered to a rod made of a resin and having a diameter of 3 mm and a rod having a diameter of 3 mm was formed of another object (polyacetal). The obtained item was brought into contact with the support in a horizontal manner and allowed to slide on the support with a load of 500 g being applied to the contact surface at a speed of 300 mm/min. The coefficient of kinetic friction was calculated from the obtained sliding resistance value. A PPC paper sheet was used as the receiving object and polyacetal was used as the material for the head of the transfer tool.

Evaluation of the Running Characteristic of the Support

The pressure sensitive correction tape transfer tool was run on the PPC sheet under a condition wherein the transfer layer was peeled off from the tape at the head portion as shown in FIG. 2. Cases in which the pressure sensitive correction tape could be easily drawn out by running the transfer tool are indicated by ◎, cases in which the pressure sensitive correction tape could be drawn out by running the transfer tool are indicated by ○, and cases in which some great force was necessary to draw out the pressure sensitive correction tape by running the transfer tool are indicated by ×.

The higher the coefficient of kinetic friction of the support against the PPC. paper sheet is the more favorable the running characteristic of the support becomes.

Evaluation of Unglossiness

Using the pressure sensitive correction tape transfer tool, the transfer layer was transferred onto a PPC sheet under a transfer load of 500 g and the gloss of the surface of the transfer layer transferred was measured.

Measuring device employed: Gloss Meter Model GM-26D (manufactured by Kabushiki Kaisha Murakami Shikisai Kagaku Kenkyusho)

Measuring condition: 60 degrees gloss measurement (according to JIS Z 8741)

The lower the measured value is the more favorable the unglossiness is. It is preferable that the gloss value be not more than 35.

TABLE 1

| | Support | Content of particles in release layer on masking layer side (% by weight) | Coefficient of kinetic friction Against PPC paper | Against polyacetal | Difference | Running characteristics | Gloss |
|---|---|---|---|---|---|---|---|
| Ex. 1 | PET (12 μm) | 1.0 | 0.033 | 0.013 | 0.02 | ○ | 35 |
| Ex. 2 | PET (12 μm) | 5.0 | 0.073 | 0.013 | 0.06 | ○ | 22 |
| Ex. 3 | PET (12 μm) | 40 | 0.183 | 0.013 | 0.17 | ◎ | 11 |
| COM. Ex. 1 | PET (12 μm) | 0 | 0.018 | 0.013 | 0.005 | X | 56 |
| COM. Ex. 2 | PET (12 μm) | 0.5 | 0.021 | 0.013 | 0.008 | X | 45 |
| COM. Ex. 3 | Glass-ine paper (40 μm) | 0 | 0.053 | 0.017 | 0.035 | ○ | 14 |

As evident from the results shown in Table 1, required characteristics, such as running characteristic of the support or unglossiness, could be obtained where the content of particles in the release layer on the side contacting the masking layer was in the range of 1 to 40% by weight (Examples 1 to 3).

In the case where the content of particles was less than 1% by weight, a fairly great load was required to draw out the support and unglossiness of the transfer layer transferred could not be obtained (Comparative Examples 1 to 2). While characteristics required for the support could be obtained when the support was of glassine paper (thickness 40 μm), it could not be obtained for satisfactory strength when the support was made thin (e.g., approximately 20 μm) owing to the fact that it was made of paper.

EXAMPLE 4

Releasing Treatment of Support

A release layer was formed by applying and drying a silicone resin-containing liquid of the following composition on one side of a PET film having a thickness of 12 μm so that the coating amount after drying was 0.5 g/m$^2$ (thickness: 0.5 μm).

| Composition of silicone resin-containing liquid Component | Parts by weight |
|---|---|
| Silicone resin (KS-3502, manufactured by Shin-Etsu Silicone Co., Ltd.) | 20 |
| Platinum catalyst | 0.2 |
| Toluene | 40 |
| Xylene | 40 |
| Silica (average particle size: 0.5 μm) | 0.2 |

A composition similar to the above silicone resin-containing liquid, except without silica particles, was applied onto a rear surface of the PET film so that the thickness after drying was 0.5 μm and dried thereafter to form a release layer on the rear side.

Manufacture of Pressure Sensitive Adhesive Tape

Onto the particles-containing release layer of the obtained support was applied an acrylic resin based adhesive so that the thickness after drying was 15 μm and dried thereafter to form a pressure sensitive adhesive layer, yielding an original web for transfer-type pressure sensitive adhesive tape.

Figure 3:
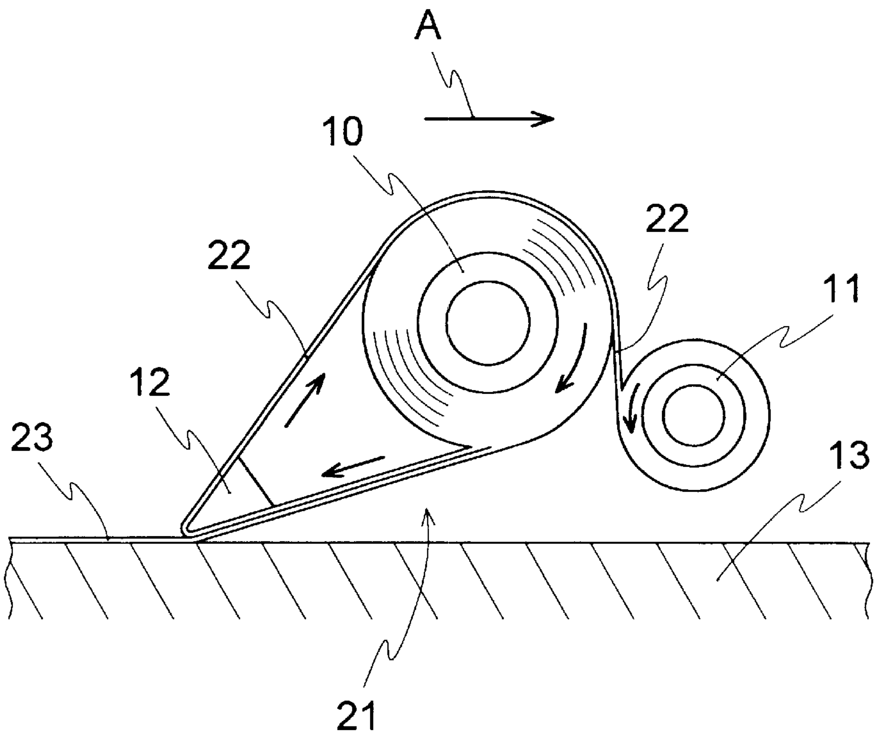
FIG. 3 is a schematic view showing another example of a handy-type transfer tool in which a transfer-type pressure sensitive adhesive tape according to another embodiment of the present invention is mounted.
Figure 4:
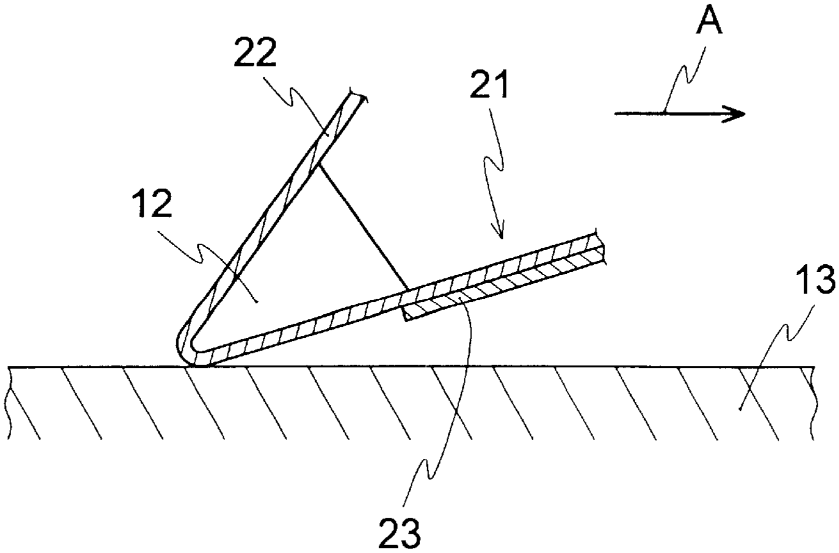
FIG. 4 is an enlarged view of a main portion of the transfer tool as shown in FIG. 3.

The original web for transfer-type pressure sensitive adhesive tape obtained above was slit into 5 mm-wide tapes and, at the same time, each tape having a length of 10 m was wound around a core to obtain a sample in a pancake form. The pancake sample was mounted in a commercially available handy-type transfer tool (having a structure as shown in FIGS. 3 to 4) to obtain a transfer-type pressure sensitive adhesive tape transfer tool.

EXAMPLES 5 TO 6 COMPARATIVE EXAMPLES 4 TO 6

The same procedures as in Example 4 except that the content of silica particles in the release layer on the side contacting the pressure sensitive adhesive layer was changed to values as shown in Table 2, were repeated to give original webs for transfer-type pressure sensitive adhesive tape, from which pancakes were produced. Each pancake was mounted in a transfer tool to yield transfer-type pressure sensitive adhesive tape transfer tools. In Comparative Example 6, glassine paper having a thickness of 40 μm was used as the support.

Coefficients of kinetic friction of the supports were measured according to the same measuring method as already described and performances of the transfer-type pressure sensitive adhesive tapes were evaluated according to the following method. The results are shown in Table 2.

Evaluation of the Running Characteristic of the Support

The transfer-type pressure sensitive adhesive tape transfer tool was run on the PPC sheet under a condition, wherein the pressure sensitive adhesive layer was peeled off from the tape at the head portion as shown in FIG. 4. Cases in which the pressure sensitive adhesive tape could be easily drawn out by running the transfer tool are indicated by ◎, cases in which the pressure sensitive adhesive tape could be drawn out by running the transfer tool are indicated by ○, and cases in which some great force was necessary to draw out the pressure sensitive adhesive tape by running the transfer tool are indicated by ×.

The higher the coefficient of kinetic friction of the support against the PPC paper sheet is the more favorable the running characteristic of the support becomes.

TABLE 2

| | Support | Content of particles in release layer on pressure sensitive adhesive layer side (% by weight) | Coefficient of kinetic friction: Against PPC paper | Coefficient of kinetic friction: Against polyacetal | Coefficient of kinetic friction: Difference | Running characteristics |
|---|---|---|---|---|---|---|
| Ex. 4 | PET (12 μm) | 1.0 | 0.023 | 0.013 | 0.010 | ○ |
| Ex. 5 | PET (12 μm) | 5.0 | 0.063 | 0.013 | 0.050 | ○ |
| Ex. 6 | PET (12 μm) | 40 | 0.163 | 0.013 | 0.150 | ○ |
| COM. Ex. 4 | PET (12 μm) | 0 | 0.018 | 0.013 | 0.005 | X |
| COM. Ex.5 | PET (12 μm) | 0.5 | 0.019 | 0.013 | 0.006 | X |
| COM. Ex. 6 | Glassine paper (40 μm) | 0 | 0.053 | 0.017 | 0.035 | ○ |

As evident from the results shown in Table 2, required characteristics, such as running characteristic of the support, could be obtained where the content of particles in the release layer on the side contacting the pressure sensitive adhesive layer was not less than 1% by weight (Examples 4 to 6).

In the case where the content of particles was less than 1% by weight, a fairly great load was required to draw out the support (Comparative Examples 4 to 5). While characteristics required for the support could be obtained where the support was of glassine paper (thickness 40 μm), it could not be obtained for satisfactory strength when the support was made thin (e.g. approximately 20 μm) owing to the fact that it was made of paper.

EXAMPLE 7

A masking layer of the following composition was formed on one side of each of the supports as shown in Table 4.

| Component | Parts by weight |
|---|---|
| Titanium oxide (particle size: 0.1 to 1 μm) | 50.0 |
| Magnesium carbonate (particle size: 1 to 10 μm) | 19.0 |
| SEBS copolymer (elongation percentage: 750%) | 14.0 |
| Alicyclic saturated hydrocarbon (elongation percentage: 0%) | 14.0 |
| Dispersing agent (HOMOGENOL L-18) | 3.0 |

Elongation percentage of binder: 370%

For example, 100 parts of the total amount of the above materials and 163 parts of toluene were mixed in a dispersing apparatus for 20 minutes to prepare a coating liquid. This was applied onto one side of each support by means of a coating machine and dried thereafter to form a masking layer. Thereafter, an aqueous dispersion (solid content: 20% by weight) of an acrylic resin based adhesive was applied onto the masking layer and dried to form a pressure sensitive adhesive layer, yielding a transfer-type pressure sensitive correction tape. The thickness of the masking layer and the pressure sensitive adhesive layer as well as the total thickness of both are indicated in Table 3. Types of the supports employed are as indicated in Table 4. By combining types of supports, the thickness Y and the total thickness X of the masking layer and the pressure sensitive adhesive layer, a total of 35 types of original webs for transfer-type pressure sensitive correction tape were obtained.

Each of the original webs for transfer-type pressure sensitive correction tape was slit into 5 mm-wide tapes and, at the same time, each tape having a length of 10 m was wound around a core to obtain a correction tape in a pancake form. Each of the correction tapes in a pancake form was mounted in a commercially available handy-type transfer tool (having a structure as shown in FIGS. 1 to 2) for performing running test over the whole length (10 m) to check whether failure in transfer onto high quality paper would occur, and evaluation of transferability was performed according to the following standards. The results are shown in Table 4.

○ No failure in transfer occurs

× Failure in transfer occurs

TABLE 3

| Masking layer (μm) | Pressure sensitive adhesive layer (μm) | Total thickness (μm) |
|---|---|---|
| 8.8 | 1.2 | 10 |
| 13.8 | 1.2 | 15 |
| 18.8 | 1.2 | 20 |
| 23.8 | 1.2 | 25 |
| 28.8 | 1.2 | 30 |

of the support in the same manner as in Example 7 to obtain an original web for transfer-type pressure sensitive correction tape.

A correction tape in a pancake form was obtained from the obtained original web for transfer-type pressure sensitive correction tape in the same manner as in Example 7 and the same was mounted in a commercially available transfer tool for performing transfer onto high quality paper (PPC paper). It was found that favorable running characteristic of the support were exhibited such that the pressure sensitive correction tape could be easily drawn out, that no failure in transfer occurred, that excellent transferability was exhibited and that no glossiness of transferred portions was observed to show any incompatibilities.

The present invention provides a transfer-type pressure sensitive correction tape at low cost that employs a film

TABLE 4

| Support | | Total thickness (X) of masking layer and pressure sensitive adhesive layer | | | | |
|---|---|---|---|---|---|---|
| Thickness (Y) | | 10 μm | 15 μm | 20 μm | 25 μm | 30 μm |
| PET | X/Y | 1.67 | 2.50 | 3.33 | 4.17 | 5.00 |
| 6 μm | Transferability | ○ | ○ | ○ | ○ | ○ |
| PET | X/Y | 0.83 | 1.25 | 1.67 | 2.08 | 2.50 |
| 12 μm | Transferability | X | ○ | ○ | ○ | ○ |
| PET | X/Y | 0.63 | 0.94 | 1.25 | 1.56 | 1.88 |
| 16 μm | Transferability | X | X | ○ | ○ | ○ |
| PET | X/Y | 0.53 | 0.79 | 1.05 | 1.32 | 1.58 |
| 19 μm | Transferability | X | X | ○ | ○ | ○ |
| PET | X/Y | 0.40 | 0.60 | 0.80 | 1.00 | 1.20 |
| 25 μm | Transferability | X | X | X | ○ | ○ |
| PET | X/Y | 0.26 | 0.39 | 0.53 | 0.66 | 0.79 |
| 38 μm | Transferability | X | X | X | X | X |
| Glassine | X/Y | 0.29 | 0.44 | 0.59 | 0.74 | 0.88 |
| paper 34 μm | Transferability | X | X | X | X | X |

It can be understood from the results as shown in Table 4 that no failure in transfer occurs and favorable transferability is exhibited when the thickness Y of the PET film is not more than 25 μm while maintaining a relationship of $X/Y \geqq 1$ between the thickness Y of the PET film and the total thickness X of the masking layer and pressure sensitive adhesive layer.

EXAMPLE 8

A release layer containing particles therein and having a thickness of 0.5 μm was formed by applying and drying a coating liquid of the following composition onto one side of a PET film having a thickness of 12 μm.

| Component | Parts by weight |
|---|---|
| Silicone resin | 25.0 |
| Silica particles (average particle size: 1.5 μm) | 0.5 |
| Toluene | 37.5 |
| Xylene | 37.5 |

A composition similar to the above coating liquid except without silica particles, was applied onto a rear surface of the PET film, and dried thereafter to form a release layer having a thickness of 0.5 μm on the rear side.

Thereafter, a masking layer having a thickness of 23.8 μm and a pressure sensitive adhesive layer having a thickness of 1.2 μm were formed on the particles-containing release layer support and exhibits both favorable running characteristic of the support and unglossiness. As a result, it is possible to use thin supports, thereby making compact transfer-type pressure sensitive correction tapes.

The present invention also provides a transfer-type pressure sensitive adhesive tape at low cost that employs a film support and exhibits superior running characteristic of supports. As a result, it is possible to use thin supports, thereby making compact transfer-type pressure sensitive adhesive tapes.

Further, by employing an organic polymer film having a thickness of not more than 25 μm as a support and maintaining a relationship of $X/Y \geqq 1$ between the thickness Y of the support and thickness X of the pressure sensitive transfer layer, superior transferability can be obtained.

What is claimed is:

1. A pressure sensitive transfer tape for use in a tool for transferring a pressure sensitive transfer layer comprising a film support comprising an organic polymer and a pressure sensitive transfer layer on the film support, the pressure sensitive transfer layer comprising at least a pressure sensitive adhesive layer, the support having a first coefficient of kinetic friction on the transfer layer side of the support against a surface of an object receiving the transfer and a second coefficient of kinetic friction on the rear side of the support against a head member of a transfer tool, the first coefficient of kinetic friction being larger than the second coefficient of kinetic friction, and a difference between the first coefficient of kinetic friction and the second coefficient of kinetic friction being not less than 0.01.

2. The pressure sensitive transfer tape according to claim 1, wherein the support has respective release layers on both sides thereof and wherein the release layer on the transfer layer side contains not less than 1% by weight of inorganic or organic particles having an average particle size of 0.3 to 5 $\mu$m.

3. The pressure sensitive transfer tape according to claim 1, wherein the pressure sensitive transfer layer has a laminated structure comprising a masking layer and a pressure sensitive adhesive layer laminated in this order from the support side.

4. The pressure sensitive transfer tape according to claim 3, wherein the support has respective release layers on both sides thereof and wherein the release layer on the transfer layer side contains not less than 1% by weight of inorganic or organic particles having an average particle size of 0.3 to 5 $\mu$m.

5. The pressure sensitive transfer tape according to claim 1, wherein the pressure sensitive transfer layer comprises the pressure sensitive adhesive layer alone.

6. The pressure sensitive transfer tape according to claim 5, wherein the support has respective release layers on both sides thereof and wherein the release layer on the transfer layer side contains not less than 1% by weight of inorganic or organic particles having an average particle size of 0.3 to 5 $\mu$m.

7. The pressure sensitive transfer tape according to claim 1, wherein the following relationships:

$$Y \leqq 25\ \mu m$$

$$X/Y \geqq 1$$

wherein Y denotes a thickness of the support and X a thickness of the pressure sensitive transfer layer are satisfied.

8. The pressure sensitive transfer tape according to claim 7, wherein the pressure sensitive transfer layer has a laminated structure comprising a masking layer and a pressure sensitive adhesive layer laminated in this order from the support side.

9. The pressure sensitive transfer tape according to claim 8, wherein the support has respective release layers on both sides thereof and wherein the release layer on the transfer layer side contains not less than 1% by weight of inorganic or organic particles having an average particle size of 0.3 to 5 $\mu$m.

* * * * *